United States Patent
Kane et al.

(10) Patent No.: US 6,859,001 B2
(45) Date of Patent: Feb. 22, 2005

(54) TORQUE RIPPLE AND NOISE REDUCTION BY AVOIDING MECHANICAL RESONANCE FOR A BRUSHLESS DC MACHINE

(75) Inventors: Ajit Kane, Bangalore (IN); Amit Sanglikar, Bangalore (IN)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 10/626,808

(22) Filed: Jul. 24, 2003

(65) Prior Publication Data

US 2005/0017661 A1 Jan. 27, 2005

(51) Int. Cl.[7] .................................................. H02P 7/06
(52) U.S. Cl. ...................... 318/254; 318/439; 318/138; 318/599; 318/459; 318/500; 318/629; 318/632; 388/902; 388/904; 388/928.1; 388/930
(58) Field of Search ................................ 318/254, 138, 318/439, 629, 632, 459, 500, 432, 434; 388/902, 904, 928.1, 930

(56) References Cited

U.S. PATENT DOCUMENTS

| | | | |
|---|---|---|---|
| 3,590,353 A | | 6/1971 | Kobayashi et al. |
| 3,662,238 A | | 5/1972 | Kobayashi et al. |
| 4,396,875 A | | 8/1983 | Yamauchi |
| 4,500,830 A | | 2/1985 | Gotou et al. |
| 4,618,808 A | | 10/1986 | Ish-Shalom et al. |
| 4,633,150 A | * | 12/1986 | Inaji et al. .................. 318/254 |
| 4,651,067 A | | 3/1987 | Ito et al. |
| 4,713,590 A | | 12/1987 | Ohno |
| 5,191,269 A | * | 3/1993 | Carbolante ................. 318/254 |
| 5,202,614 A | * | 4/1993 | Peters et al. ................ 318/254 |
| 5,220,259 A | | 6/1993 | Werner et al. |
| 5,223,775 A | | 6/1993 | Mongeau |
| 5,306,988 A | * | 4/1994 | Carobolante et al. ....... 318/254 |
| 5,309,078 A | * | 5/1994 | Cameron .................... 318/811 |
| 5,362,222 A | | 11/1994 | Faig et al. |
| 5,397,972 A | * | 3/1995 | Maiocchi .................... 318/439 |
| 5,428,522 A | | 6/1995 | Millner et al. |

(List continued on next page.)

FOREIGN PATENT DOCUMENTS

| | | |
|---|---|---|
| EP | 0 533 359 | 11/1995 |
| EP | 0 564 608 | 1/1997 |
| EP | 0 735 660 | 5/1998 |
| EP | 0 715 566 | 1/1999 |
| EP | 0 954 090 | 11/1999 |
| EP | 1 104 087 | 5/2001 |
| WO | 97/25767 | 7/1997 |
| WO | 98/37484 | 8/1998 |
| WO | 00/46912 | 8/2000 |
| WO | 00/60724 | 10/2000 |
| WO | 01/59288 | 8/2001 |
| WO | 02/20293 | 3/2002 |

OTHER PUBLICATIONS

Byung–Il Kwon, et al., "Novel Topology of Unequal Air Gap in a Single–Phase Brushless DC Motor," IEEE Transactions on Magnetics, vol. 37, No. 5, Sep. 2001 P.P. 3723–3726.

LSI Computer Systems, Inc., "Single Phase Brushless DC Motor Controller Using the LS7261/7262," Application Note 104, Dec. 1996.

Primary Examiner—Rina Duda
(74) Attorney, Agent, or Firm—Cantor Colburn LLP (57) ABSTRACT

A method of reducing torque ripple and noise for an brushless DC machine comprising: determining a control frequency for the electric machine, the control frequency indicative of an existing current command to and a rotational velocity of the electric machine; multiplying the control frequency by a selected multiple and forming a modulating signal responsive thereto; and formulating a modified command profile. The method also includes: correlating and synchronizing the modified command profile with the existing current command and a rotor position for the electric machine; and generating a modulated current command to the electric machine.

19 Claims, 5 Drawing Sheets

U.S. PATENT DOCUMENTS

| | | |
|---|---|---|
| 5,444,341 A | 8/1995 | Kneifel, II et al. |
| 5,530,326 A | 6/1996 | Galvin et al. |
| 5,717,537 A | 2/1998 | Watanabe et al. |
| 5,731,670 A | 3/1998 | Galbiati et al. |
| 5,999,168 A | 12/1999 | Rosenberg et al. |
| 6,104,152 A | 8/2000 | Coles et al. |
| 6,122,579 A | 9/2000 | Collier-Hallman et al. |
| 6,124,688 A | 9/2000 | Coles et al. |
| 6,198,246 B1 | 3/2001 | Yutkowitz |
| 6,236,174 B1 | 5/2001 | White |
| 6,259,221 B1 | 7/2001 | Yutkowitz |
| 6,281,650 B1 | 8/2001 | Yutkowitz |
| 6,323,609 B1 | 11/2001 | Lopez |
| 2001/0045941 A1 | 11/2001 | Rosenberg et al. |
| 2001/0048278 A1 | 12/2001 | Young et al. |
| 2001/0051098 A1 | 12/2001 | Kenney et al. |

\* cited by examiner

TORQUE RIPPLE AND NOISE REDUCTION BY AVOIDING MECHANICAL RESONANCE FOR A BRUSHLESS DC MACHINE

BACKGROUND

This invention relates generally to a method and system of avoiding mechanical resonance and thereby reducing the audible noise in mechanical system such as HVAC systems. Specifically, the frequency of the torque ripple is shifted to avoid mechanical resonance of a blower assembly being driven by a brushless DC machine.

Torque ripple in conventionally excited brushless DC motors is related to the flatness of the torque waveform of the motor, which in turn depends on the back EMF and current waveforms. A single-phase brushless DC motor inherently develops relatively higher torque ripple magnitude than it's three-phase counterpart. Such torque ripple results in mechanical vibration of the mechanical system resulting in undesired audible noise. It will be appreciated that the audible noise generated depends upon several factors including mechanical system resonance frequency, magnitude and frequency of the torque ripple developed by motor. The frequency of torque ripple is typically of order 50 Hz–250 Hz, which is in vicinity to the mechanical system resonance frequency.

Various other methods have been proposed in the past for torque ripple reduction of single-phase electrically commutated machines (ECM) which fall mainly in either following approaches:

(A) Advancing the commutation angle of motor drive circuit, which reduces negative torque as well as peak-to-peak torque ripple;

(B) Injecting a constant current into the motor.

Advancing the commutation angle requires sophisticated controls and additional feedback sensors and increases motor current. Injecting a constant current decreases efficiency and increases heat dissipation. Although these methods would reduce the torque ripple magnitude they do not address the fact that the frequency of the torque ripple still remains below the mechanical assembly resonant frequency. Hence the torque ripple produced still results in audible noise. Therefore, what is needed in the art is a method for shifting the spectral content of the torque ripple and to make it flat to avoid the mechanical assembly excitation.

The above discussed and other features and advantages of the embodiments will be appreciated and understood by those skilled in the art from the following detailed description and drawings.

SUMMARY OF INVENTION

Disclosed herein in an exemplary embodiment is a method of reducing torque ripple and noise for an brushless DC machine comprising: determining a control frequency for the electric machine, the control frequency indicative of an existing current command to and a rotational velocity of the electric machine; multiplying the control frequency by a selected multiple and forming a modulating signal responsive thereto; and formulating a modified command profile. The method also includes: correlating and synchronizing the modified command profile with the existing current command and a rotor position for the electric machine; and generating a modulated current command to the electric machine.

Also disclosed herein in an exemplary embodiment is a system for reducing torque ripple and noise for an electric machine comprising: an electric machine in operable communication with an inverter; a position sensor in operable communication with the electric machine, the position sensor configured to detect a position of the electric machine and transmit a signal indicative thereof; and a current sensor configured to measure a current supplied to the electric machine and transmit a signal indicative thereof. The system also includes a controller in operable communication with the inverter, the position sensor, and the current sensor, the controller configured to execute a method comprising: determining a control frequency for the electric machine, the control frequency indicative of an existing current command to, and a rotational velocity of, the electric machine; multiplying the control frequency by a selected multiple and forming a modulating signal responsive thereto; formulating a modified command profile; correlating and synchronizing modified command profile with the existing current command and a rotor position for the electric machine; and generating a modulated current command to the electric machine.

Disclosed herein in yet another exemplary embodiment is a system for reducing torque ripple and noise for an electric machine comprising: a means for determining a control frequency for the electric machine, the control frequency indicative of an existing current command to and a rotational velocity of the electric machine; a means for multiplying the control frequency by a selected multiple and forming a modulating signal responsive thereto; a means for formulating a modified command profile; a means for correlating and synchronizing the modified command profile with the existing current command and a rotor position for the electric machine; and a means for generating a modulated current command to the electric machine.

BRIEF DESCRIPTION OF THE DRAWINGS

Referring to the exemplary drawings wherein like elements are numbered alike in the several Figures.

DETAILED DESCRIPTION OF THE INVENTION

Figure 1:
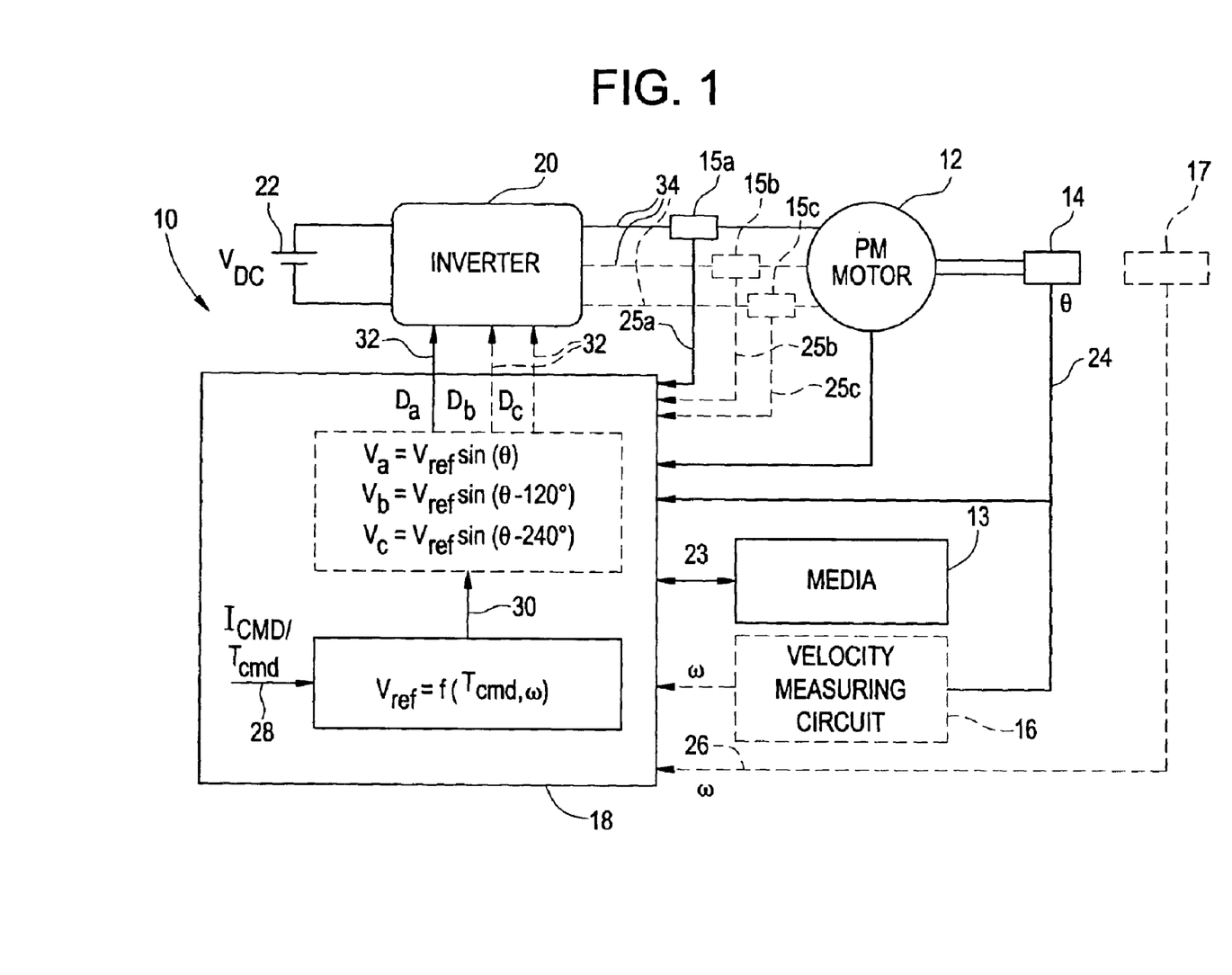
FIG. 1 depicts a PM motor system in accordance with an exemplary embodiment.

Referring now to the drawings in detail, FIG. 1 depicts a PM motor system where numeral 10 generally indicates a system for controlling the torque of a sinusoidally excited PM motor 12. The system includes an optional rotor position encoder 14, speed measuring circuit 16, controller 18, power circuit or inverter 20 and power source 22.

In the scheme depicted, the torque of the motor 12 is controlled using current mode control utilizing a current sensor 15. For current mode control, a current sensor 15a, 15b, and 15c (only one for single phase motors) transmits signals 25a, 25b, and 25c respectively, to the controller 18 indicative of the motor current (one or more phases, three are shown). In current mode control, a desired current (based upon a command or desired torque) is compared with an actual torque (proportional to current) applied to the motor 12 in a closed loop feedback system. Optionally, in voltage mode control, instead of/in addition to, controlling the torque producing current, the controller determines the voltage required for producing the desired torque. Often this is accomplished by employing a model of the motor 12 and the parameters for the motor 12. While an exemplary embodiment of the invention is described by way of illustration with current mode control, it will be appreciated that voltage mode control may be employed with motor current sensing.

Continuing with FIG. 1, for the controller 18 to develop the correct current/voltage needed to produce the desired torque, position etc, the position and speed of the rotor is often utilized. An optional rotor position encoder 14 is connected to the motor 12 to detect the angular position of the rotor. The encoder 14 may sense the rotary position based on optical detection or magnetic field variations. The encoder 14 outputs a position signal 24 indicating the angular position of the rotor. In an exemplary embodiment, a Hall sensor is employed for the position sensor 14.

Optionally, from the position signal 24, a velocity measuring circuit 16 determines the velocity of the rotor and outputs a velocity signal 26. The circuit 16 may include a counter that counts the position signal pulses for a predetermined duration. The count value is proportional to the velocity of the motor. For example, if a counter counts the position signal pulses in time intervals of 5 ms and the encoder has a resolution of 2.5 degree, the speed measurement will have a resolution of about 41.7 rpm. The speed signal can also be obtained as the derivative of the position signal from the equation ωm=Δθm/Δt where Δt is the sampling time and Δθm is the change in position during the sampling interval. In yet another option, a velocity sensor 17 may be employed to directly measure the velocity of the motor 12 and provide a velocity signal 26.

The current signals, 25a, 25b, 25c, position 24, velocity 26, and a torque/current (or a position) command signals 28 are applied to the controller 18. This current may be measured at the output from, or the input to, the motor 12, in the inverter 20, or may be estimated from measurements of the rotor speed or position and the current drawn by the inverter 20. The sensors 15a, 15b, and 15c are shown for clarity. The torque/position command signal 28 is indicative of the desired motor torque/position. In an exemplary embodiment, the controller 18 determines the voltage amplitude $V_{ref}$ 30 required to develop the desired torque/position by using the current, position, speed, and torque command signals 24, 26, 28, and other fixed motor parameter values. For a three-phase motor, three sinusoidal reference signals that are synchronized with the motor back EMP Ẽ are employed to generate the required motor input voltages. For a single phase motor only a single reference signal and phase voltage command signal is employed. For a current controlled motor, the measured current(s) are compared with the desired current/torque to form a current/torque error. This error is then utilized to form a voltage command (e.g. $V_{ref}$ 30) to the motor responsive to the current/torque error.

The controller 18 transforms the voltage amplitude signal $V_{ref}$ 30 into a phase voltage command for application to the motor 12. For a single phase machine, the inverter 20 applies current to the poles of the stator of the PM motor 12 in accordance with the position of the motor. Alternately exciting the poles to induce attraction and repulsion of the rotor poles. In an exemplary embodiment, a standard H-Bridge inverter 20 with four switching devices (not shown) is employed for a PM motor 12 with two poles. It will be appreciated that a variety of PM motor and inverter configurations are conceivable. Multiple pole configurations include numerous benefits, but also add complexity to the controller 18 and inverter 20.

For a three phase machine, the controller 18 transforms the voltage amplitude signal $V_{ref}$ 30 into three phases by determining phase voltage command signals $V_a$, $V_b$, and $V_c$ from the voltage amplitude signal 30 and the position signal 24 according to the following equations:

$$V_a = V_{ref} \sin(\theta) \quad (1); \text{ and}$$

optionally $$V_b = V_{ref} \sin(\theta - 120°) \quad (2); \text{ and}$$

$$V_c = V_{ref} \sin(\theta - 240°) \quad (3).$$

Motor voltage command signals 32 (single phase or multi-phased) of the controller 18 are applied to a power circuit or inverter 20, which is coupled with a power source 22 to apply a phase voltage(s) 34 to the stator winding(s) of the motor in response to the motor voltage command signals 32. But in order to generate phase voltages 34 with an average sinusoidal shape, switching devices (not shown) of the inverter 20 must be turned on and off for specific durations at specific rotor angular positions. Control of the inverter 20 may be implemented according to any appropriate pulse width modulation (PWM) scheme.

Figure 2:
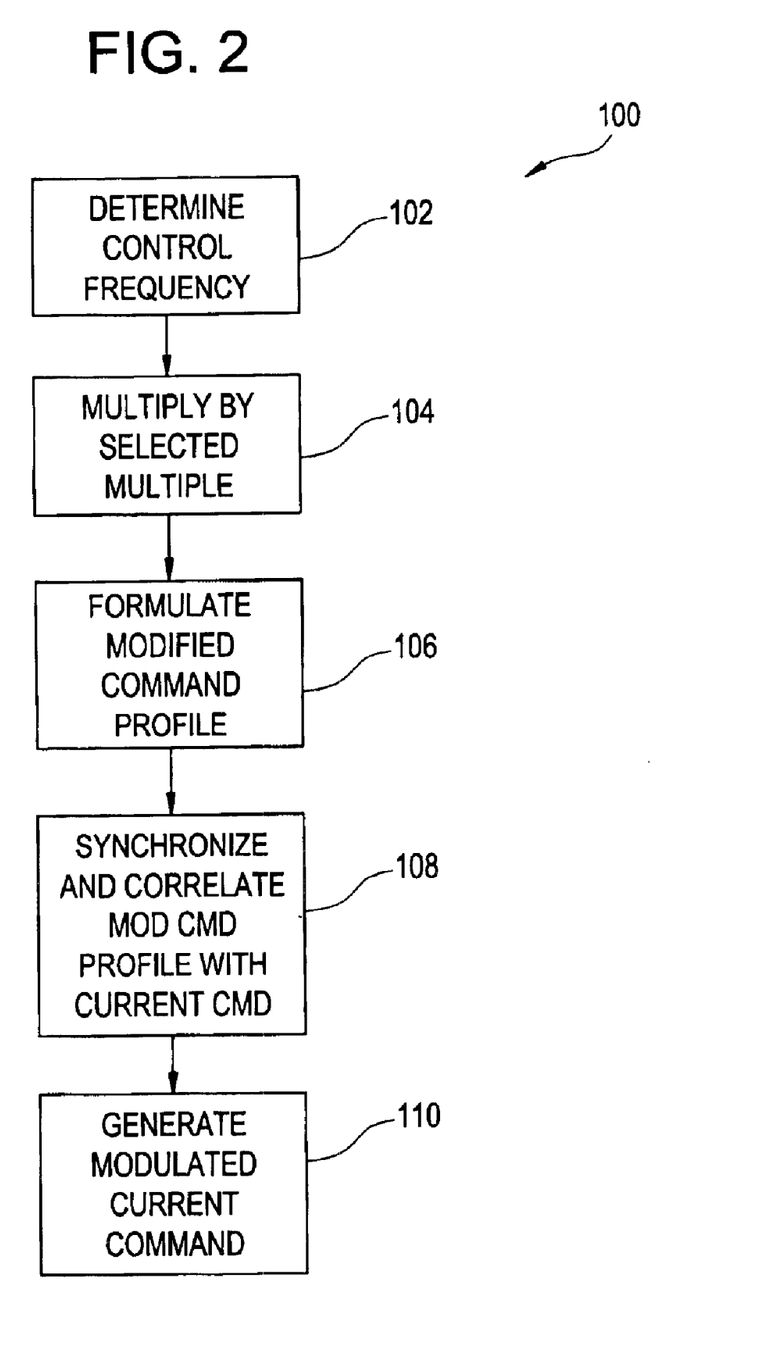
FIG. 2 is a flowchart depicting a methodology in accordance with an exemplary embodiment.

In an exemplary embodiment, the motor 12 and controller 18 employ a control scheme that increases the torque ripple frequency of the motor 12. Turning now to FIG. 2 as well, a flow chart depicting an exemplary frequency shifting and current control methodology 100 is depicted. The current control methodology 100 addresses the issue of audible noise in the motor 12 by changing/shifting the torque ripple frequency rather than necessarily addressing the magnitude of torque ripple. The frequency of the torque ripple is shifted by manipulating the "frequency" of the current applied to the motor. In addition, the flatness of the torque waveform may be increased by modulating the amplitude of the current command. In an exemplary embodiment, current through the motor is forced to be at higher frequency, which is an integral multiple of the back EMF signal and the current magnitude is varied over a cycle. Modification of the current magnitude facilitates torque ripple reduction, while manipulation of the frequency shifts the frequency of the torque ripple. Advantageously, then the mechanical assembly (e.g., motor and mounting and load) acts as a filter to attenuate the high frequency components of the torque. This results in a lower torque ripple and hence less audible noise.

Figure 3A:
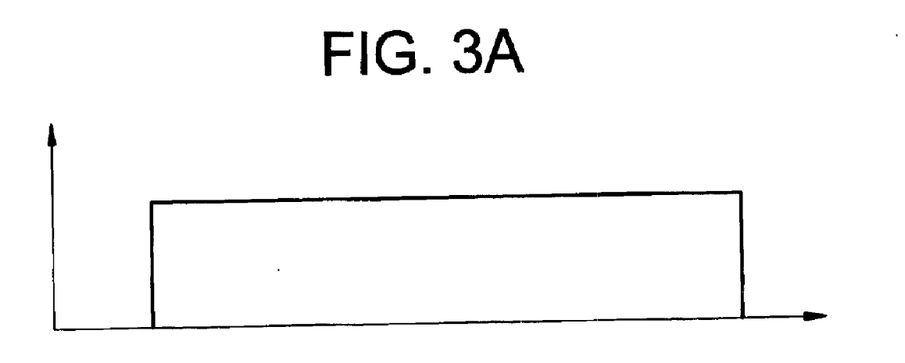
FIG. 3A depicts an illustrative modified command profile.
Figure 3B:
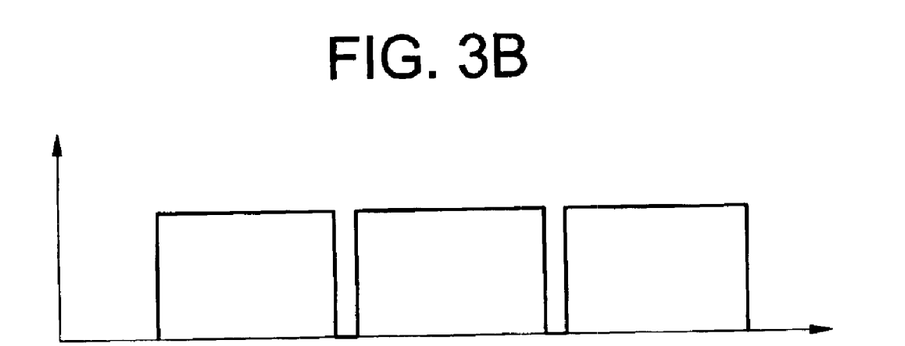
FIG. 3B depicts an illustrative modified command profile in accordance with an exemplary embodiment.
Figure 3C:
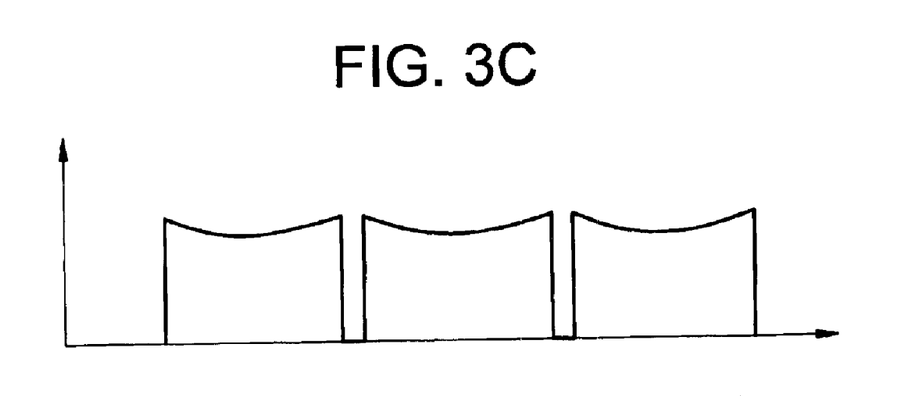
FIG. 3C depicts an illustrative modified command profile in accordance with an exemplary embodiment where the magnitude and frequency of the command profile is modulated.

Continuing with FIGS. 1 and 2, in an exemplary embodiment, the frequency shifting current control methodology is employed to manipulate the commanded current to include higher frequency components. As a result the torque ripple also exhibits higher frequency components. At process block 102, the frequency of rotation for the motor 12 is determined based on the position sensor 14. At process block 104, the frequency of the motor is injected/modulated with a frequency that is higher than the existing frequency. In an exemplary embodiment, an integral multiple of the back EMF is employed. For example, three times the frequency as determined. This results in a torque ripple frequency of six times the frequency of the back-EMF. At process block 106, a modified command profile employing the higher frequency elements is generated. The modified command profile is a combination of the existing (lower frequency) command including the modulated or "chopped" higher frequency. For example, as may be seen in FIG. 3A an illustrative half pulse/period of the current command is depicted. In FIG. 3B, the full period is modulated by a frequency six times greater, and thereby segmenting the half period into three smaller "pulses". A similar modification and segmenting is employed for the remaining half period. In an exemplary embodiment, positive pulses are employed returning to approximately zero as depicted. FIG. 3C depicts an instance where the magnitude and frequency of the command profile is modulated.

Returning to FIG. 2, the modified command profile is correlated and synchronized with the existing current command at process block 108 to form a modified current command including the higher frequency components. The modified current command is then directed to the motor 12 as depicted at process block 110.

Figure 4A:
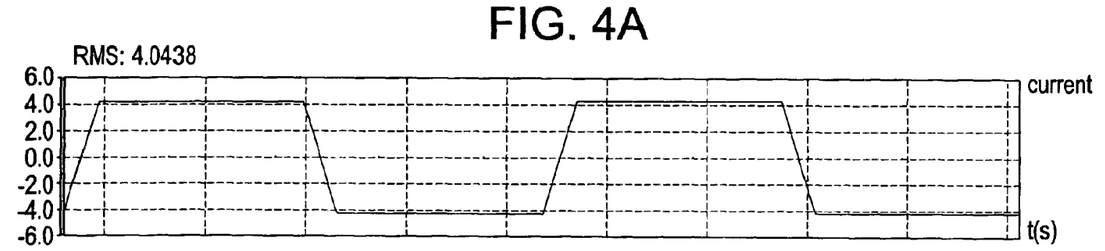
FIG. 4A depicts an illustrative current waveform for a motor.
Figure 4B:
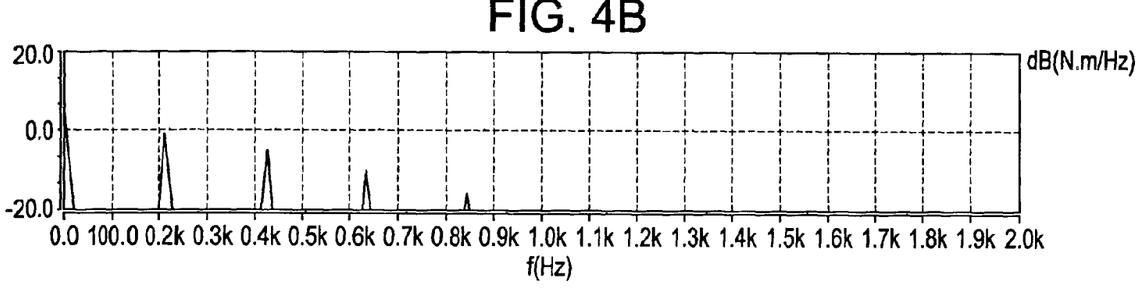
FIG. 4B depicts the spectral content of the torque waveform of FIG. 4C.
Figure 4C:
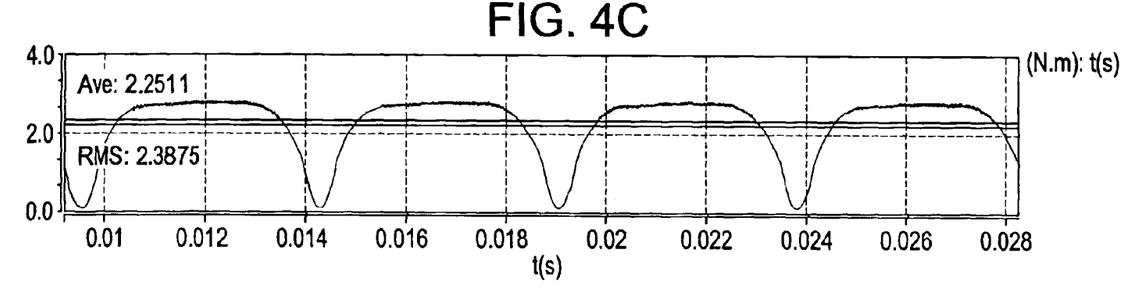
FIG. 4C depicts an illustration of the torque produced with the motor current of FIG. 4A.

Turning now to FIGS. 4 and 5, wherein the advantages and benefits of an exemplary embodiment may become readily apparent. FIG. 4A depicts an illustrative current waveform for a motor. FIG. 4B depicts the spectral content of the torque waveform of FIG. 4A. FIG. 4C depicts an illustration of the torque ripple associated with the motor current of FIG. 4A.

Figure 5A:
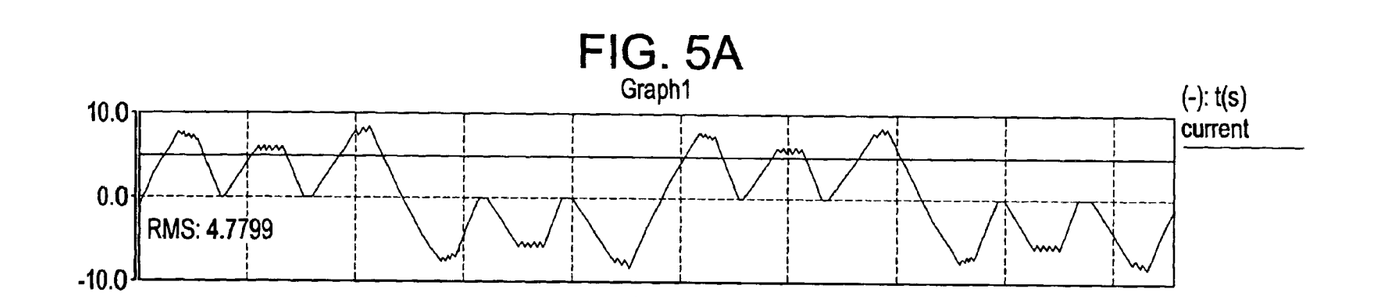
FIG. 5A depicts an illustrative current waveform for a motor in accordance with an exemplary embodiment.
Figure 5B:
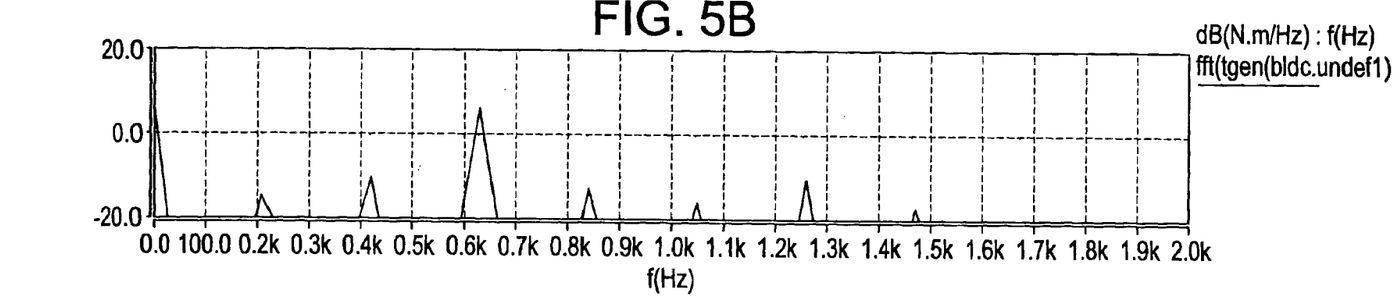
FIG. 5B depicts the spectral content of the modified torque waveform of FIG. 5C.
Figure 5C:
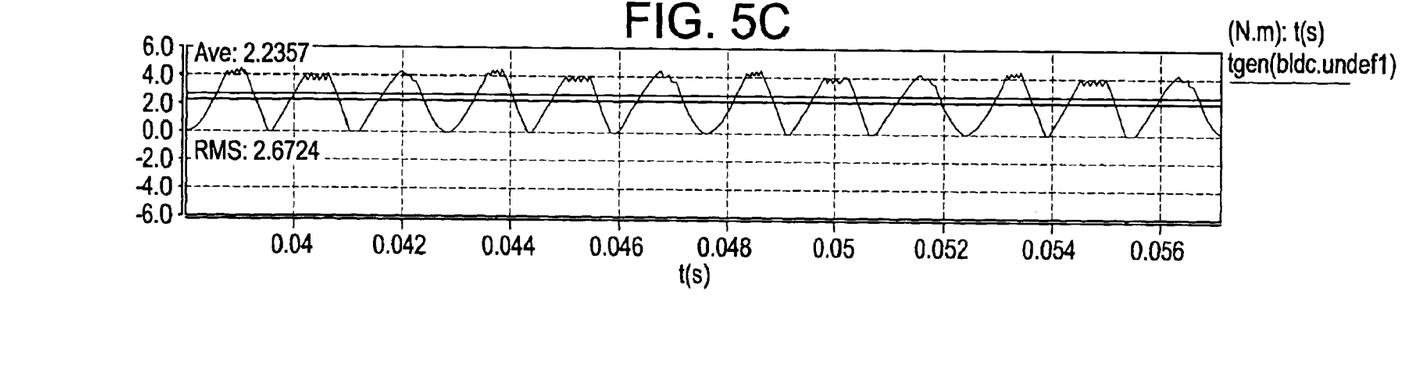
FIG. 5C depicts an illustration of the torque produced with the motor current of FIG. 5A.

FIG. 5A depicts an illustrative current waveform for a motor in accordance with an exemplary embodiment. It will be appreciated that the waveform is modulated with a frequency of about six times the original current frequency. FIG. 5B depicts the spectral content of the modified torque waveform of FIG. 5A. Note how the primary spectral energy has shifted to approximately 600 Hz. Finally, FIG. 5C depicts an illustration of the torque associated with the motor current of FIG. 5A. Note how the frequency of the torque ripple has increased relative to that depicted in FIG. 4C.

It will be appreciated that the proposed methodology exhibits numerous advantages over existing methodologies for reducing the audible noise. First, the traditional methods each have a limit beyond which they fail to reduce the torque ripple. Second, the existing methodologies often require increased currents, which reduces efficiency and increases heating. Conversely, it should be appreciated that the methodology disclosed herein increases the torque ripple frequency rather than necessarily changing the torque ripple magnitude. The shift in torque ripple frequency results in reduced audible noise as the higher frequency torque ripple avoids resonant frequencies of the motor 12 and associated mechanical assemblies. In fact, it should be noted, that in some instances the magnitude of the torque ripple of the motor alone may actually increase. Yet, because of the new frequency and the damping effect of the mechanical apparatus, the torque ripple and the audible noise there from is reduced. Third, the disclosed system and methodology is independent of the mechanical assembly employed. Systems that rely solely on the mechanical assembly to eliminate torque ripple are highly dependent upon variations in the mechanical assembly and the dynamics thereof. In the instance of the exemplary embodiments disclosed herein, while the mechanical assembly is utilized to attenuate the higher frequency torque ripple, sensitivity to variations in the dynamic characteristics of the mechanical assembly are significantly reduced.

The disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code as a data signal 23, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of reducing torque ripple and noise for an brushless DC machine comprising:

determining a control frequency for said electric machine, said control frequency indicative of an existing current command to and a rotational velocity of said electric machine;

multiplying said control frequency by a selected multiple and forming a modulating signal responsive thereto;

formulating a modified command profile;

correlating and synchronizing said modified command profile with said existing current command and a rotor position for said electric machine; and generating a modulated current command to said electric machine.

2. The method of claim 1 wherein said selected multiple corresponds to an even-integral multiple of a frequency of a back-EMF voltage of said electric machine.

3. The method of claim 1 wherein said selected multiple is at least twice said frequency of said back-EMF.

4. The method of claim 1 wherein said formulating includes combining an existing current command waveform with said modulating signal.

5. The method of claim 1 wherein said modified command profile is based on said existing current command and said modulating signal.

6. The method of claim 1 wherein said correlating and synchronizing is configured to avoid generation of additional low frequency components in a vicinity of a spectral range of said frequency of said back-EMF voltage.

7. The method of claim 1 wherein said modulated current command is configured to reduce torque ripple at a frequency of about said control frequency.

8. The method of claim 1 wherein said formulating further includes modulating a magnitude of said profile and thereby said modulated current command to reduce torque ripple.

9. The method of claim 1 wherein said electric machine is a single phase brushless DC motor.

10. A system for reducing torque ripple and noise for an electric machine comprising:

an electric machine in operable communication with an inverter;

a position sensor in operable communication with said electric machine, said position sensor configured to detect a position of said electric machine and transmit a signal indicative thereof;

a current sensor configured to measure a current supplied to said electric machine and transmit a signal indicative thereof;

a controller in operable communication with said inverter, said position sensor, and said current sensor, said controller configured to execute a method comprising:

determining a control frequency for said electric machine, said control frequency indicative of an existing current command to, and a rotational velocity of, said electric machine;

multiplying said control frequency by a selected multiple and forming a modulating signal responsive thereto;

formulating a modified command profile;

correlating and synchronizing said modified command profile with said existing current command and a rotor position for said electric machine; and generating a modulated current command to said electric machine.

11. The system of claim 10 wherein said selected multiple corresponds to an even-integral multiple of a frequency of a back-EMF voltage of said electric machine.

12. The system of claim 10 wherein said selected multiple is at least twice said frequency of said back-EMF.

13. The system of claim 10 wherein said formulating includes combining an existing current command waveform with said modulating signal.

14. The system of claim 10 wherein said modified command profile is based on said existing current command and said modulating signal.

15. The system of claim 10 wherein said modified command profile is configured to avoid generation of additional low frequency components in a vicinity of a spectral range of said frequency of said back-EMF voltage.

16. The system of claim 10 wherein said modulated current command is configured to reduce torque ripple at a frequency of about said control frequency.

17. The system of claim 10 further including a magnitude of said modified command profile is modulated and thereby said modulated current command to reduce torque ripple.

18. The system of claim 10 wherein said electric machine is a single phase brushless DC motor.

19. A system for reducing torque ripple and noise for an electric machine comprising:

a means for determining a control frequency for said electric machine, said control frequency indicative of an existing current command to and a rotational velocity of said electric machine;

a means for multiplying said control frequency by a selected multiple and forming a modulating signal responsive thereto;

a means for formulating a modified command profile;

a means for correlating and synchronizing said modified command profile with said existing current command and a rotor position for said electric machine; and a means for generating a modulated current command to said electric machine.

* * * * *

UNITED STATES PATENT AND TRADEMARK OFFICE
CERTIFICATE OF CORRECTION

PATENT NO. : 6,859,001 B2
DATED : February 22, 2005
INVENTOR(S) : Kane et al.

It is certified that error appears in the above-identified patent and that said Letters Patent is hereby corrected as shown below:

Column 3,
Line 62, after "back" delete, "EMPË" and insert therefor -- $\mathrm{EM\overline{F}\ddot{E}}$ --

Signed and Sealed this

Twenty-fourth Day of May, 2005

JON W. DUDAS
*Director of the United States Patent and Trademark Office*